Patented July 31, 1934

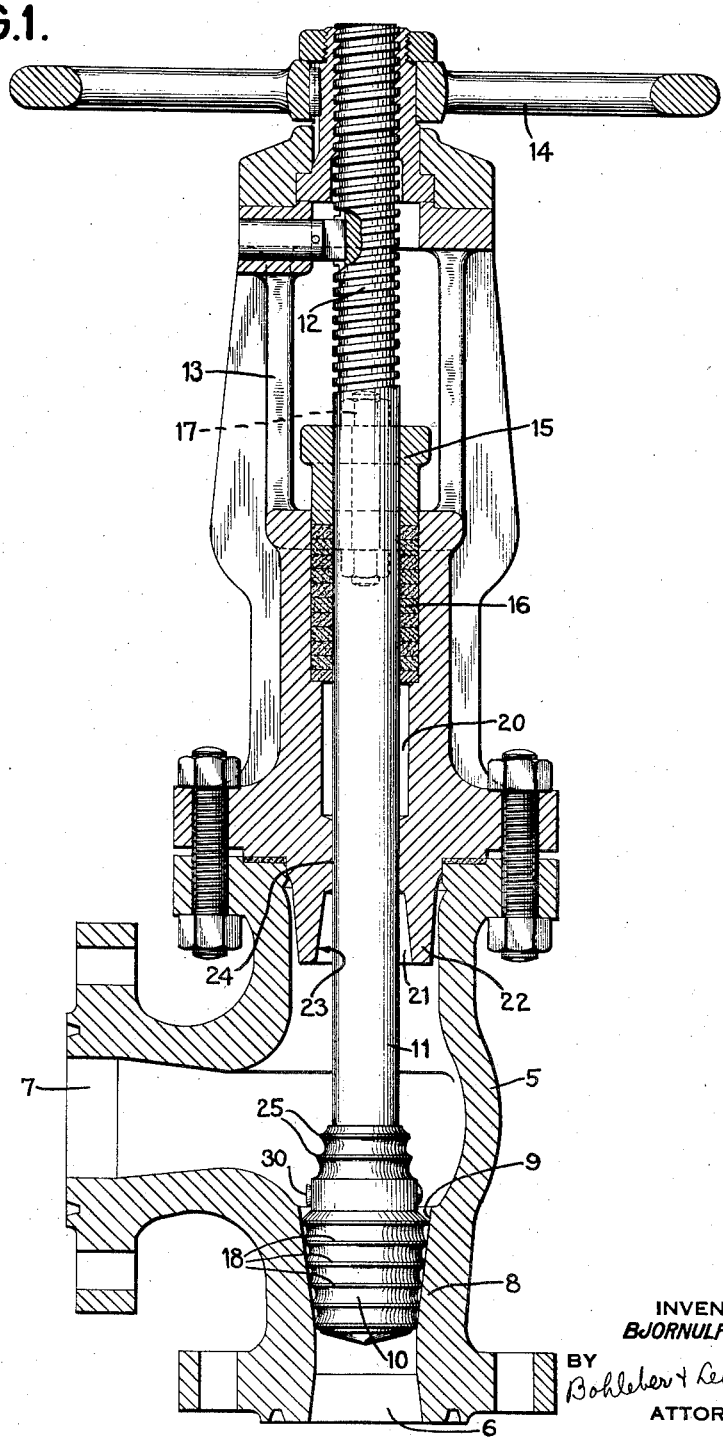

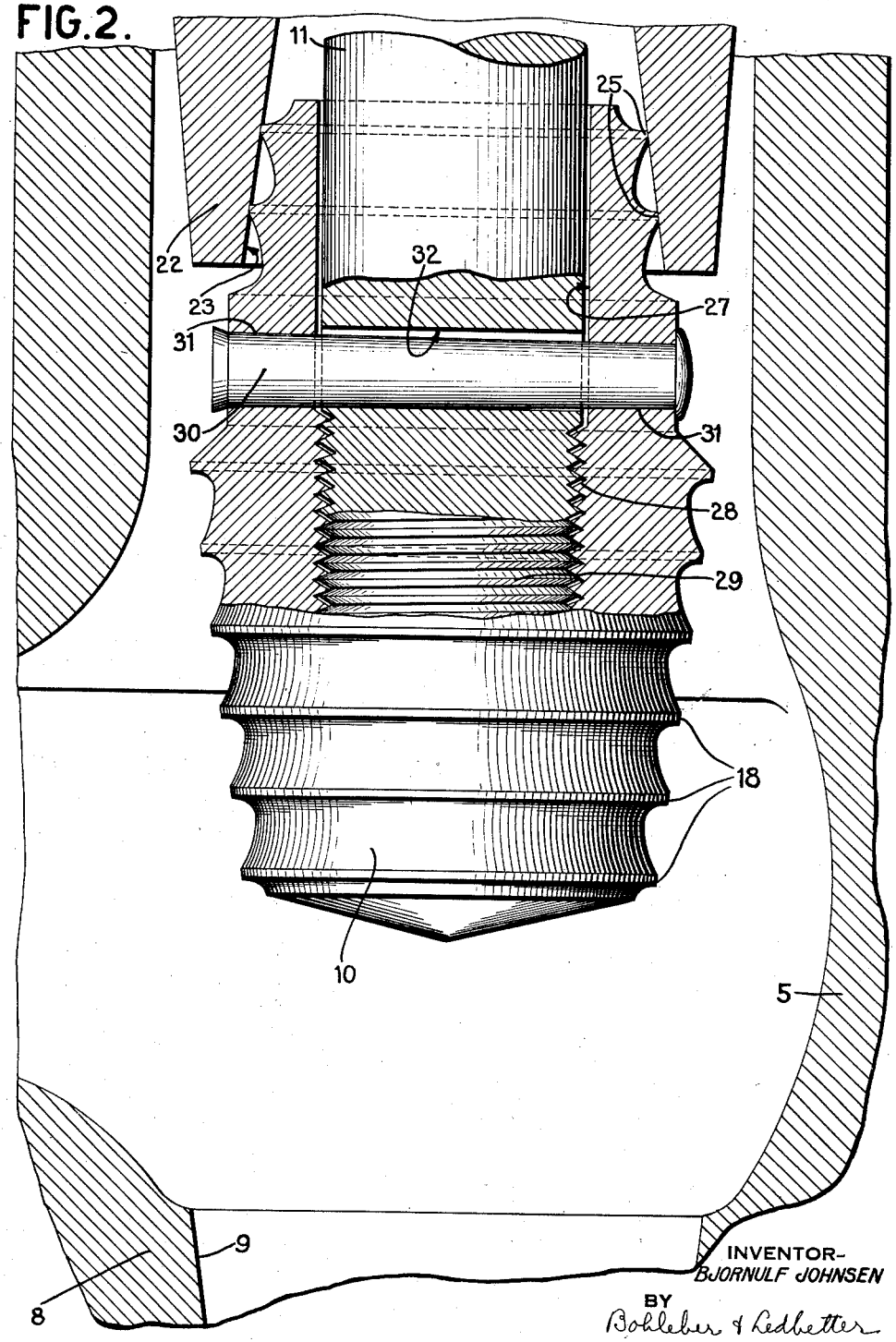

1,968,779

UNITED STATES PATENT OFFICE 1,968,779

SEALING MEANS FOR VALVES

Bjornulf Johnsen, Brooklyn, N. Y., assignor to The Ludlow Valve Manufacturing Company, Troy, N. Y., a corporation of New Jersey Application February 11, 1932, Serial No. 592,222

3 Claims. (Cl. 251—27)

This invention relates broadly to valves in which the valve stem packing may be replaced when the valve, in use, is in open position and more particularly to such valves adapted to control fluid at high pressure.

A primary object of the invention is a valve structure which shall permit the packing about the valve stem to be replaced when the valve is in open position.

In accordance with the invention, the valve stem and valve casing, respectively, carry co-operating sealing means which seals the joint between the valve stem and the valve casing when the valve is in open position, so that the packing gland may be removed and the packing readily replaced without leakage of fluid past the valve stem.

The invention also seeks sealing means for valves when in open position, which is applicable to a valve of any type just so long as it is provided with a valve stem, and it is immaterial whether the valve stem reciprocates only or rotates during reciprocation in moving the valve between open and closed position.

It is also an object of the invention to provide a valve of the character described with a plurality of sealing contacts any one or more of which may be operable for the purpose specified.

These and other objects of the invention and the means for their attainment will be more apparent from the following detailed description, taken in connection with the accompanying drawings illustrating one embodiment by which the invention may be realized, and in which:

Figure 1 is a vertical sectional view, showing the valve of this invention in closed position; and Figure 2 is a detailed view, on an enlarged scale, showing the valve of Figure 1 in open position, the valve stem passage being sealed by the sealing means of this invention.

While the invention has been illustrated and will be described as applied to a cone valve, which is opened by translation of the valve stem, it will be apparent, as the description proceeds, that the invention is equally applicable to any type of valve wherein the valve stem may either rotate in moving the valve between open and closed position or be movable axially for the same purpose.

In the drawings, the invention is shown as applied to a valve casing 5 having an inlet port 6 and an outlet port 7. Axially in line with the inlet port and in its lower end, the casing 5 is formed with, or otherwise provided with, a tube-like female member portion 8, shown as having a smooth conical interior wall 9.

The female member 8 receives the valve shown as an axially adjustable male member or cone 10. For the purpose of axially adjusting the valve 10 with respect to the female member 8, the same is shown as mounted upon the lower end of a valve stem 11 formed with threads 12 engaging corresponding threads formed in a nut illustrated as rotating in an outside yoke 13, which latter, as shown, is secured in any convenient fashion to the upper end of the valve casing 5. The valve stem 11 is provided, at its upper end, with a hand wheel 14 and extends through a packing gland 15 retaining the packing 16 in a suitable recess surrounding the valve stem 11 and within the yoke member 13. The packing gland 15 is adjustable and otherwise secured in position by means of the bolts 17.

For preventing undesirable rise in the velocity of the fluid expanding between the inlet port 6 and the outlet port 7, the male conical member 10 is formed with a series of recurring annular ribs or flanges 18, defining therebetween annular expansion chambers. These ribs and expansion chambers may take the form illustrated in the patent to Henry B. Lee, reissued October 14, 1930, Reissue No. 17,824. Neither the shape of the valve casing nor the configuration of the valve form part of the present invention, and it is to be understood that the valve casing and valve are shown as of the pressure reducing type solely for the purpose of illustrating a valve controlling fluid at high pressure and not for the purpose of limiting the application of the invention to any particular type of valve.

The passage 20 in the valve casing and for the valve stem 11 terminates at its inner extremity in a passage of enlarged diameter 21 defined by what may be called a downwardly or inwardly depending apron 22 having a conical or flaring inside surface 23 so that the diameter of the opening 21 gradually increases from the valve stem bearing 24 inwardly toward the interior of the valve casing 5. This apron 22 forms a sealing means adapted to co-operate with a co-acting sealing means carried by the valve stem 11. As shown, a plurality of ribs 25 are carried with the stem 11, and the outer marginal surfaces of the ribs conveniently lie in a plane substantially corresponding to the surface 23 of the apron so that when the valve is in fully opened position, at least one of the ribs 25 will contact with and seat upon the inside apron surface 23 and form a sealing contact which will prevent the access of the fluid to the valve stem passage 20, thereby effectively sealing the passage 20 against the fluid at high pressure. The co-operating sealing means 22, 25 are shown in sealing position in Figure 2. By virtue of the tapering surface 23 of the apron 22 and the substantially corresponding inclination of the conical plane including the ribs 25, the valve stem may be drawn upwardly until at least one of the ribs 25 comes in sealing contact with the surface 23, as will be understood.

To compensate for any irregularity in alignment of the valve stem 11 or for other reasons, the coacting sealing ribs 25 are preferably mounted upon the valve stem with provision for relative movement. This is conveniently accomplished, as shown, by a construction in which the valve 10 is integral with or forms a carrier member on which the ribs 25 are formed and in the preferred embodiment, the valve and ribs are formed on a single casting or forging having a central bore 27 of a diameter slightly larger than the diameter of the stem 11, which bore is threaded at its innermost end, as at 28, to receive, and preferably loosely, the threaded end 29 of the valve stem. A pin 30 passes through the valve or carrier from side to side and fits substantially closely in registering apertures 31 therein while the valve stem is apertured, as at 32, with a hole of larger diameter than the pin so as to loosely receive the pin and allow a certain degree of lost motion or play between the carrier and the valve stem thereby facilitating the seating of one or more of the ribs 25 upon the conical surface 23 of the companion sealing member 22.

The operation of the sealing device will be apparent from the foregoing description. Suffice it to say that if it is desired to change the packing without putting the pipe line out of commission, it is only necessary to open the valve to its fully open position thus causing the ribs 25 to enter the enlarged portion of the stem passage until one or more of the ribs 25 seat in the passage and effectively seal it against the pressure of the fluid passing from the inlet 6 to the outlet 7. With the passage 20 thus effectively sealed, it is a simple matter to remove the bolts 17 and the packing gland 15 to replace the packing 16. It will also be observed that with the valve in its fully opened position, the sealing effected in the manner described effectively closes the passage 20 to the fluid and thus protects the packing in great measure against deterioration during use of the valve.

Various modifications will occur to those skilled in the art in the composition, configuration and disposition of the component elements going to make up the invention as a whole, as well as in the application of the invention to seal a passage, and no limitation is intended by the phraseology of the foregoing description or illustrations in the accompanying drawings, except as indicated in the appended claims.

What is claimed is:—

1. A valve adapted to control fluid at high pressure, comprising a valve stem formed proximate its inner end with an aperture, a cone valve carried thereby and formed with diametrically disposed apertures in register with the aperture in the valve stem but of smaller diameter, a pin snugly fitting the aperture in one of said members and having a loose fit in the other member, a valve casing formed with a passage for the valve stem, the inner end of said passage being of gradually increasing diameter, said valve being formed with a plurality of sealing contacts adapted to be received in the passage of increasing diameter when the valve is in open position.

2. A valve adapted to control fluid at high pressure, comprising a valve stem formed proximate its inner end with an aperture, a cone valve carried thereby and formed with diametrically disposed apertures in register with the apertures in the valve stem but of smaller diameter, a pin snugly fitting the aperture in one of said members and having a loose fit in the other member, a valve casing formed with a passage for the valve stem, the inner end of said passage being of gradually increasing diameter, said valve being formed with a plurality of annular ribs of different diameter adapted to be received in the passage of increasing diameter when the valve is in open position.

3. A valve adapted to control fluid at high pressure, comprising a valve stem formed proximate its inner end with an aperture and threaded at its inner end, a cone valve carried thereby and formed with an inwardly threaded recess of a diameter larger than the diameter of the valve stem and formed with diametrically disposed apertures in register with the aperture in the valve stem but of smaller diameter, a pin snugly fitting the apertures in said valve and having a loose fit in the registering aperture, a valve casing formed with a depending annular apron having a passage for the valve stem of gradually increasing diameter, said valve being formed with a plurality of annular ribs of different diameters adapted to be received in the passage of increasing diameter when the valve is in open position.

BJORNULF JOHNSEN.